United States Patent
Guan et al.

(10) Patent No.: US 7,831,121 B2
(45) Date of Patent: Nov. 9, 2010

(54) EXTENDED TRIANGULAR LATTICE TYPE PHOTONIC BANDGAP FIBER

(75) Inventors: Ning Guan, Sakura (JP); Katsuhiro Takenaga, Sakura (JP); Kuniharu Himeno, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 12/430,986

(22) Filed: Apr. 28, 2009

(65) Prior Publication Data

US 2009/0208176 A1    Aug. 20, 2009

Related U.S. Application Data

(62) Division of application No. 11/693,509, filed on Mar. 29, 2007, now Pat. No. 7,551,824.

(30) Foreign Application Priority Data

Mar. 29, 2006   (JP) ............................. 2006-089676

(51) Int. Cl.
*G02B 6/036* (2006.01)
(52) U.S. Cl. .................... 385/125; 385/126
(58) Field of Classification Search ............ 385/125, 385/126
See application file for complete search history.

(56) References Cited

U.S. PATENT DOCUMENTS

| | | | |
|---|---|---|---|
| 6,539,155 B1 | 3/2003 | Broeng et al. | |
| 6,598,428 B1 | 7/2003 | Cryan et al. | |
| 6,711,200 B1 * | 3/2004 | Scherer et al. | 372/64 |
| 6,804,446 B1 * | 10/2004 | Nordin et al. | 385/132 |
| 6,901,194 B2 * | 5/2005 | Charlton et al. | 385/122 |
| 6,954,574 B1 | 10/2005 | Russell et al. | |
| 6,990,282 B2 * | 1/2006 | Russell et al. | 385/125 |
| 7,346,239 B2 * | 3/2008 | Romagnoli et al. | 385/39 |
| 7,509,013 B2 * | 3/2009 | Noda et al. | 385/129 |
| 2002/0061176 A1 | 5/2002 | Libori et al. | |
| 2003/0059185 A1 * | 3/2003 | Russell et al. | 385/125 |
| 2003/0174940 A1 * | 9/2003 | Charlton et al. | 385/27 |

(Continued)

FOREIGN PATENT DOCUMENTS

JP    2003-227941 A    8/2003

(Continued)

OTHER PUBLICATIONS

Takenaga et al., "A New Photonic Bandgap Fibre with Extended Triangular Lattice and Capillary Core," ECOC 2005 Proceedings, Sep. 25, 2005, vol. 2, pp. TU 4.2-1-TU 4.2-2, XP002442305 Glasgow, GB *whole document*.

(Continued)

*Primary Examiner*—K. Cyrus Kianni
(74) *Attorney, Agent, or Firm*—Sughrue Mion, PLLC

(57) ABSTRACT

An extended triangular lattice type photonic bandgap fiber, includes a cladding and a capillary core, the cladding having a plurality of holes disposed within a silica glass portion in a longitudinal direction of the fiber and arranged in an extended triangular lattice shape, the capillary core having a plurality of holes arranged in a triangular lattice shape, wherein the cross-sectional area of the respective holes in the capillary core is smaller than that of the respective holes in the cladding.

4 Claims, 12 Drawing Sheets

U.S. PATENT DOCUMENTS

| | | | |
|---|---|---|---|
| 2004/0091224 A1* | 5/2004 | Baumberg et al. | 385/129 |
| 2004/0156610 A1* | 8/2004 | Charlton et al. | 385/129 |
| 2005/0226561 A1* | 10/2005 | Romagnoli et al. | 385/39 |
| 2005/0226578 A1 | 10/2005 | Mangan et al. | |
| 2005/0249470 A1* | 11/2005 | Bird et al. | 385/125 |
| 2005/0276556 A1 | 12/2005 | Williams et al. | |
| 2006/0010921 A1* | 1/2006 | Mori et al. | 65/393 |
| 2006/0133763 A1* | 6/2006 | Dangui et al. | 385/147 |
| 2006/0153512 A1 | 7/2006 | Falkenstein et al. | |
| 2006/0202125 A1* | 9/2006 | Suhami | 250/368 |
| 2007/0163301 A1* | 7/2007 | Dong et al. | 65/393 |
| 2007/0230885 A1* | 10/2007 | Guan et al. | 385/125 |
| 2008/0112679 A1* | 5/2008 | Noda et al. | 385/129 |
| 2009/0232441 A1* | 9/2009 | Noda et al. | 385/11 |

FOREIGN PATENT DOCUMENTS

| | | |
|---|---|---|
| JP | 2005-17650 A | 1/2005 |
| WO | 02/075392 A2 | 9/2002 |
| WO | 2004/083919 A1 | 9/2004 |

OTHER PUBLICATIONS

R. Goto et al., "Wide-band single-mode photonic band-gap fiber with extended triangular lattice and capillary core," Proceedings Optical Fiber Communication Conference 2006, Mar. 5, 2006, pp. 1-3, XP002442304 Piscataway, NJ USA *p. 2*.

S. E. Barkou et al., "Photonic Bandgap Fibers," LEOS 1999, IEEE Lasers and Electro-Optics Society 1999 12$^{th}$ Annual Meeting San Francisco, CA, Nov. 8-11, 1999, Piscataway, NJ, IEEE US, vol. 2, Nov. 8, 1999, pp. 615-616, XP010360970, ISBN: 0-7803-5634-9,*figure 1*.

Cregan, et al., "Single-Mode Photonic Band Gap Guidance of Light in Air", Science, Sep. 3, 1999, pp. 1537-1539, vol. 285.

West, et al., "Surface modes in air-core photonic band-gap fibers", Optics Express, Apr. 19, 2004, pp. 1485-1496, vol. 12, No. 8, OSA.

Johnson, et al., "Block-iterative frequency-domain methods for Maxwell's equations in a planewave basis", Optics Express, Jan. 29, 2001, pp. 173-190, vol. 8, No. 3, OSA.

Kim, et al., "Designing Air-Core Photonic-Bandgap Fibers Free of Surface Modes", IEEE Journal of Quantum Electronics, May 2004, pp. 551-556, vol. 40, No. 5, IEEE.

Kaiser, et al., "Spectral losses of unclad vitreous silica and soda-lime-silicate fibers", Journal of the Optical Society of America, Sep. 1973, pp. 1141-1148, vol. 63, No. 9.

Luan, et al., "All-solid photonic band-gap fiber", Optics Letters, Oct. 15, 2004, pp. 2369-2371, vol. 29 No. 20, Optical Society of America.

Nielsen, et al., "Two-dimensional Kagome structure, fundamental hexagonal photonic crystal configuration", Electronics Letters, Sep. 30, 1999, pp. 1736-1737, vol. 35 No. 20, IEEE.

Laegsgaard et al., "Mode areas and field-energy distribution in honeycomb photonic bandgap fibers", Journal of Optical Society of America part B, Oct. 2003, pp. 2037-2045, vol. 20 No. 10, Optical Society of America.

Ryuichiro Goto, et al., "Wide-Band Single-Mode Photonic Band-Gap Fibre with Extended Triangular Lattice", IEICE Technical Report LQE2005-133 to 147 Laser and Quantum Electronics, Jan. 25, 2006, vol. 105, No. 592, pp. 29 to 32.

* cited by examiner

EXTENDED TRIANGULAR LATTICE TYPE PHOTONIC BANDGAP FIBER

This is a divisional of application Ser. No. 11/693,509 filed Mar. 29, 2007 which claims the benefit of priority of Japanese Patent Application No. 2006-089676, filed Mar. 29, 2006 The entire disclosures of the prior applications are considered part of the disclosure of the accompanying divisional application and are hereby incorporated by reference.

BACKGROUND OF THE INVENTION

1. Field of the Invention

The present invention relates to a photonic bandgap fiber (hereinafter, abbreviated as "PBGF"), and more particularly, relates to an extended triangular lattice (ETL) type PBGF which has a wider transmission bandwidth and is available to optical transmission and fiber laser optical transmission from ultraviolet range to visible light range, near-infrared range and far-infrared range.

2. Description of the Related Art

The present inventors developed an extended triangular lattice type PBGF having capillary cores, as disclosed in K. Takenaga, N. Guan, R. Goto, S. Matsuo, K. Himeno, "A New Photonic Bandgap Fibre with Extended Triangular Lattice and Capillary Core", ECOC 2005 Proceedings-Vol. 2 Paper Tu 1.4.2. FIGS. 1 and 2 are diagrams illustrating the arrangement of the conventional extended triangular lattice type PBGFs 1 and 6.

The extended triangular lattice type PBGF 1 shown in FIG. 1, includes a capillary core 4 in which a plurality of hole 2 are regularly provided in the longitudinal direction of an optical fiber, made of silica glass and in cross section of the fiber seven holes 2 in the center of the fiber are compactly arranged in a triangular lattice shape. Further, the extended triangular lattice type PBGF 1 includes a cladding 5 around the core 4 in which holes 2 and a silica glass part 3 are arranged in an extended triangular lattice shape.

The extended triangular lattice type PBGF 6 shown FIG. 2, includes a capillary core 7 in which in total thirty seven holes 2 are compactly arranged in a triangular lattice shape. Specifically, one hole of the thirty seven holes is arranged in the center of the fiber, six holes of the thirty seven holes are arranged in the first layer surrounding the one hole, twelve holes of the thirty seven holes are arranged in the second layer surrounding the first layer, and eighteen holes of the thirty seven holes are arranged in the third layer surrounding the second layer. In addition, the extended triangular lattice type PBGF 6 includes a cladding 5 around the capillary core 7 in which holes 2 and a silica glass part 3 are arranged in an extended triangular lattice shape.

In these extended triangular lattice type PBGFs 1 and 6, holes 2 of the capillary core 4, 7 and holes 2 of the cladding 5 have the same hole diameter. The cross section of holes 2 can be either a circular shape or a hexagonal shape, depending on the manufacturing condition of the PBGF, for example such as pressure difference between the interior of the hole and the exterior of the fiber base material during the course of drawing the fiber, temperature, etc.

The extended triangular lattice type PBGF, described in literature of K. Takenaga et al., employs capillary cores and thus allows broadly extending the transmission bandwidth, as compared to a conventional PBGF using hole core (air core).

However, it is expected that the application field of the optical fiber will be increasingly extended and the range of transmission bandwidth required in an optical fiber will gradually become wider from now on. Therefore, there is a need for providing an optical fiber having wide transmission bandwidth.

SUMMARY OF THE INVENTION

In light of the above, it is an object of the present invention to provide an improved PBGF that transmission bandwidth is dramatically wider than that of conventional PBGF.

In order to accomplish the above object, according to the invention, there is provided an extended triangular lattice type PBGF which has a cladding and a capillary core. The cladding has a plurality of holes disposed within a silica glass portion in a longitudinal direction. The holes in the cladding are arranged in an extended triangular lattice shape. The capillary core has a plurality of holes arranged in a triangular lattice shape. In particular, according to the extended triangular lattice type PBGF of the present embodiment, the cross-sectional area of the respective holes in the capillary core is smaller than that of the respective holes in the cladding.

Further, according to the extended triangular lattice type PBGF of the invention, it is preferable that unit cells in the extended triangular lattice of the cladding are configured such that a plurality of holes having a hexagonal cross section are arranged in the extended triangular lattice shape interposed by a wall made of silica glass. It is preferable that unit cells of the capillary core are configured such that a plurality of holes having a hexagonal cross section are arranged in a triangular lattice shape interposed by a wall made of silica glass. It is preferable that the thickness of the wall $w_b$ in the extended triangular lattice of the cladding and the thickness of the wall $w_c$ in the extended triangular lattice of the capillary core satisfy the following relation: $w_b < w_c$.

Furthermore, according to the extended triangular lattice type PBGF of the invention, it is preferable that the capillary core has seven holes in total, the one hole of which is arranged in the center of the core, and the remaining six holes are arranged in the first layer surrounding the center of the core. It is preferable that the capillary core has thirty seven holes in total, one hole is arranged in the center of the core, six holes are arranged in the first layer surrounding the center of the core, twelve holes are arranged in the second layer surrounding the first layer, and the remaining eighteen holes are arranged in the third layer surrounding the second layer. It is preferable that the capillary core has ninety one holes in total, one hole is arranged in the center of the core, and the remaining holes are arranged in five layers surrounding the center of the core. It is preferable that the capillary core has one hole layer in the center of the core and at least seven hole layers surrounding the center of the core.

Still further, according to the extended triangular lattice type PBGF of the invention, it is preferable that the thickness of the wall $w_b$ in the extended triangular lattice of the cladding satisfies the following relation: $0.03\Lambda \leq w_b \leq 0.4\Lambda$, where $\Lambda$ is a pitch in the extended triangular lattice of the cladding.

Still further, it is preferable that the thickness of the wall $w_c$ in the extended triangular lattice of the capillary core satisfies the following relation: $0.05\Lambda \leq w_c \leq 0.6\Lambda$. Further, according to the extended triangular lattice type PBGF of the invention, it is preferable that a core mode in which at least 60% of propagation power is concentrated on the region of the capillary core only is present, while a surface mode in which at least 40% of propagation power is present in the remainder of the capillary core region is absent.

Further, according to the extended triangular lattice type PBGF of the invention, it is preferable that the propagation mode is present, (1) within the range satisfying the following relation: $0.8\Lambda \leq w_r \leq \Lambda$, $0.04\Lambda \leq w_b \leq 0.12\Lambda$, $0.12\Lambda \leq w_c \leq 0.25\Lambda$, and the wavelength λ satisfying: $0.9 \leq \Gamma/\lambda \leq 1.8$; (2) within the range satisfying the following relation: $0.8\Lambda \leq w_r \leq \Lambda$, $0.04\Lambda \leq w_b \leq 0.12\Lambda$, $0.25\Lambda \leq w_c \leq 0.35\Lambda$, and the wavelength λ satisfying: $0.9 \leq \Gamma/\lambda \leq 2.4$; and (3) within the range satisfying the following relation: $0.5\Lambda \leq w_r \leq 0.9\Lambda$, $0.06\Lambda \leq w_b \leq 0.14\Lambda$, $0.15\Lambda \leq w_c \leq 0.25\Lambda$, and the wavelength λ satisfying: $0.9 \leq \Gamma/\lambda \leq 2.8$, where Λ is the pitch of an extended triangular lattice, $w_r$ is the diameter of silica glass portion in an extended triangular lattice, $w_b$ is the thickness of a wall in an extended triangular lattice of cladding, $w_c$ is the thickness of a wall in the triangular lattice of capillary core, and $\Gamma=2\Lambda$, respectively.

Furthermore, according to the invention, there is provided an extended triangular lattice type PBGF which operates in a single mode.

According the extended triangular lattice type PBGF operating in a single mode of the invention, it is preferable that unit cells in the extended triangular lattice of the cladding are configured such that a plurality of holes having a hexagonal cross section are arranged in the extended triangular lattice shape interposed by a wall made of silica glass. It is preferable that unit cells of the capillary core are configured such that a plurality of holes having a hexagonal cross section are arranged in a triangular lattice shape interposed by a wall made of silica glass. It is preferable that the thickness of the wall $w_b$ in the extended triangular lattice of the cladding and the thickness of the wall $w_c$ in the extended triangular lattice of the capillary core satisfy the following relation: $w_b < w_c$.

Still Further, according the extended triangular lattice type PBGF operating in a single mode of the invention, it is preferable that the cladding has either circular or hexagonal holes and the capillary core has either circular or hexagonal holes.

Still Further, according the extended triangular lattice type PBGF operating in a single mode of the invention, it is preferable that the capillary core has seven holes in total, the one hole is arranged in the center of the core, and the remaining six holes are arranged in the first layer surrounding the center of the core.

Still Further, according the extended triangular lattice type PBGF operating in a single mode of the invention, it is preferable that the thickness of the wall $w_b$ in the extended triangular lattice of the cladding satisfies the following relation: $0.03\Lambda \leq w_b \leq 0.2\Lambda$, where Λ is a pitch in the extended triangular lattice of the cladding.

Furthermore, it is preferable that the thickness of the wall $w_c$ in the extended triangular lattice of the capillary core satisfies the following relation: $0.05\Lambda \leq w_c \leq 0.25\Lambda$.

According the extended triangular lattice type PBGF operating in a single mode of the invention, it is preferable that a core mode in which at least 60% of propagation power is concentrated on the region of the capillary core only is present, while a surface mode in which at least 40% of propagation power is present in the remainder of the capillary core region is absent.

According the extended triangular lattice type PBGF operating in a single mode of the invention, it is preferable that the propagation mode is present, within the range satisfying the following relation: $0.6\Lambda \leq w_r \leq \Lambda$, $0.04\Lambda \leq w_b \leq 0.12\Lambda$, $0.06\Lambda \leq w_c \leq 0.18\Lambda$, and the wavelength λ satisfying: $0.8 \leq \Gamma/\lambda \leq 1.8$, where Λ is the pitch of an extended triangular lattice, $w_r$ is the diameter of silica glass portion in an extended triangular lattice, $w_b$ is the thickness of a wall in an extended triangular lattice of cladding, $w_c$ is the thickness of a wall in the triangular lattice of capillary core, and $\Gamma=2\Lambda$, respectively.

According to the invention, the extended triangular lattice type PBGF has a cladding in which the holes are arranged in an extended triangular lattice shape and a capillary core in which a plurality of holes are arranged in a triangular lattice shape. In particular, the extended triangular lattice type PBGF has the structure that the cross-sectional area of the respective holes 11 in the capillary core 14 is smaller than that of the respective holes 12 in the cladding 15. Hence, it allows increasing the equivalent refractive index of the core, thus widening the operation region of the fiber. As a results, an improved PBGF having wider transmission bandwidth than that of the conventional PBGF can be obtained.

BRIEF DESCRIPTION OF THE DRAWINGS

Aspects of the invention will become more apparent by describing in detail exemplary embodiments thereof with reference to the accompanying drawings in which.

DESCRIPTION OF THE PREFERRED EMBODIMENTS

The preferred embodiments of the invention will be described herein below with reference to the accompanying drawings.

Figure 3:
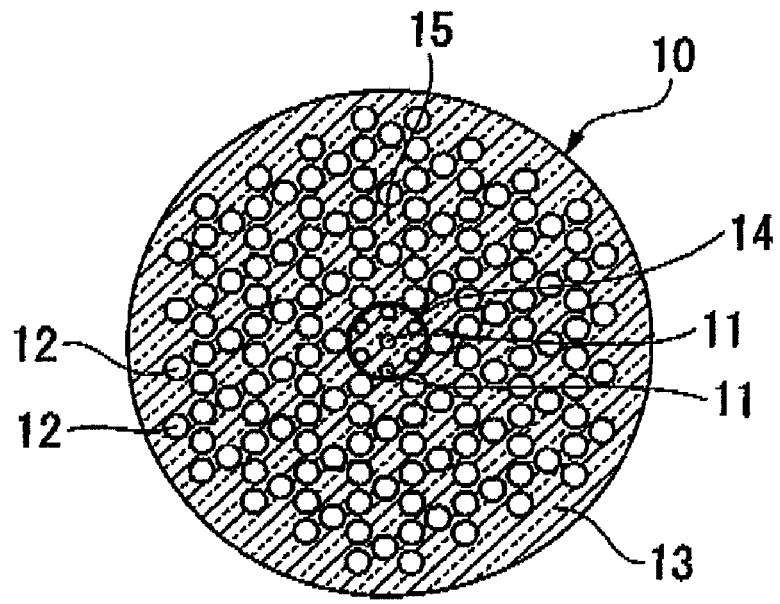
FIG. 3 is a cross-sectional view illustrating a first embodiment of the extended triangular lattice type PBGF of the invention.

FIG. 3 is a cross-sectional view illustrating a first embodiment of the extended triangular lattice type PBGF of the invention. The extended triangular lattice type PBGF 10 according to present embodiment, has a cladding 15 and a capillary core 14. The cladding 15 has a plurality of holes 11, 12 disposed within a silica glass portion 13 in a longitudinal direction. The holes 12 are arranged in an extended triangular lattice shape. The capillary core 14 has a plurality of holes 11 arranged in a triangular lattice shape. In particular, according to the extended triangular lattice type PBGF 10 of the present embodiment, the cross-sectional area of the respective holes 11 in the capillary core 14 is smaller than that of the respective holes 12 in the cladding 15.

In addition, in this embodiment, the capillary core 14 of the extended triangular lattice type PBGF 10 has seven holes 11 in total. One hole of the seven holes 11 is arranged in the center of the core, and the remaining six holes are arranged in the first layer surrounding the center of the core.

Figure 4:
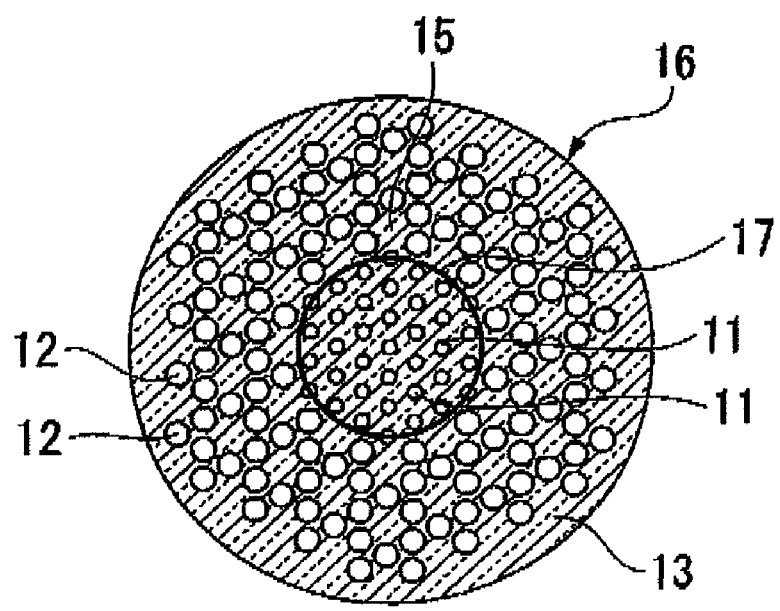
FIG. 4 is a cross-sectional view illustrating a second embodiment of the extended triangular lattice type PBGF of the invention.

FIG. 4 is a cross-sectional view illustrating a second embodiment of the extended triangular lattice type PBGF of the invention. In this embodiment, the construction of the extended triangular lattice type PBGF 16 is similar to that of the extended triangular lattice type PBGF 10 according to the first embodiment, except that the capillary core has thirty seven holes in total, one hole is arranged in the center of the core, six holes are arranged in the first layer surrounding the center of the core, twelve holes are arranged in the second layer surrounding the first layer, and the remaining eighteen holes are arranged in the third layer surrounding the second layer.

Figure 5:
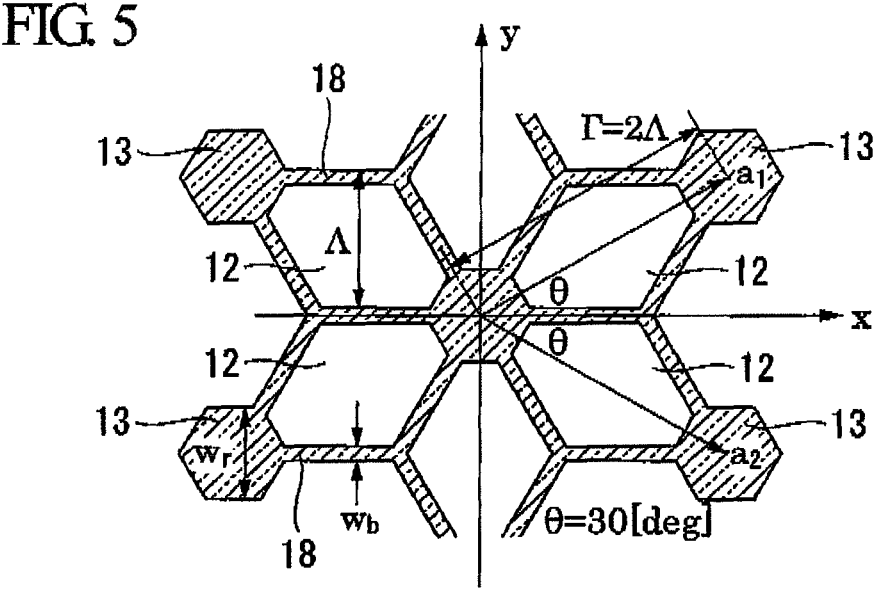
FIG. 5 is a cross-sectional view illustrating unit cells of the extended triangular lattice which is included within the cladding of the extended triangular lattice type PBGF of the invention.

FIG. 5 is a cross-sectional view illustrating the arrangement of unit cells of the extended triangular lattice which is included within the cladding of the extended triangular lattice type PBGF of the invention.

The arrangement of unit cells of the extended triangular lattice has a periodic structure that the first hole line and the second hole line are alternately folded in several times. The first hole line has a plurality of holes 12 having a hexagonal cross section. The plurality of holes 12 are aligned at the first pitch $\Lambda$, interposed by relatively thin wall 18 made of silica glass. Similarly, the second hole line has a plurality of holes 12 having a hexagonal cross section. The plurality of holes 12 are aligned at the second pitch $\Gamma$ which is twice the first pitch $\Lambda$ ($\Gamma=2\Lambda$), interposed by silica glass portion 13 having a hexagonal cross section. In this example, the hexagonal holes 12 are not a regular hexagonal, and those 2 sides adjacent to the silica glass portion 13 are shorter than the other sides. The hexagonal holes 12 are a hexagon in which length between 2 sides adjacent to the silica glass portion 13 are longer than that between the other sides. In addition, angle $\theta$ is 30 degrees. The arrangement of unit cells in the cladding of the extended triangular lattice type PBGF according to the invention is not limited to the present example.

Figure 6:
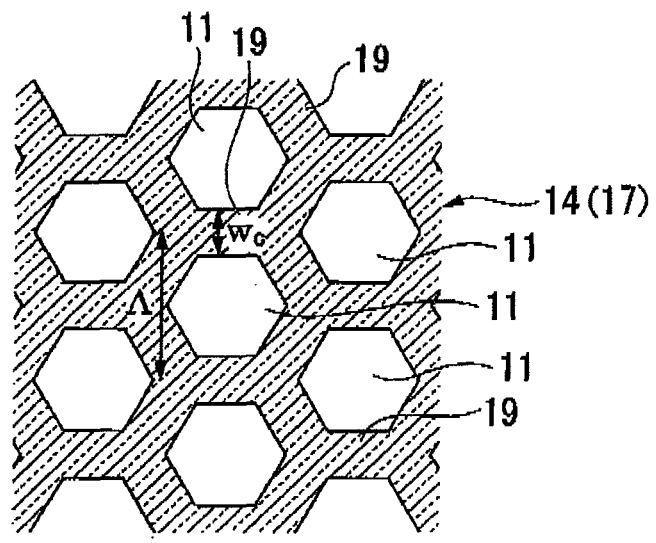
FIG. 6 is a cross-sectional view illustrating unit cells of the extended triangular lattice which is included within the core of the extended triangular lattice type PBGF of the invention.

FIG. 6 is a cross-sectional view illustrating unit cells of the extended triangular lattice which is included within the core of the extended triangular lattice type PBGF of the invention. In this example, the capillary cores 14, 17 have a plurality of holes 11 in roughly regular hexagon in cross section. The plurality of holes 11 are arranged in a triangular lattice shape, interposed by a relatively thick wall 19 made of silica glass.

Figure 7:
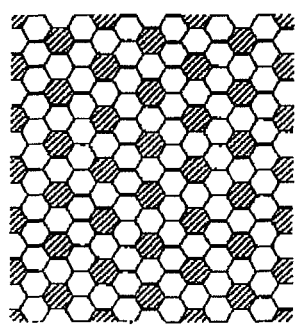
FIG. 7 is a cross-sectional view illustrating the main portion of the cladding in the extended triangular lattice type PBGF of the invention.
Figure 8:
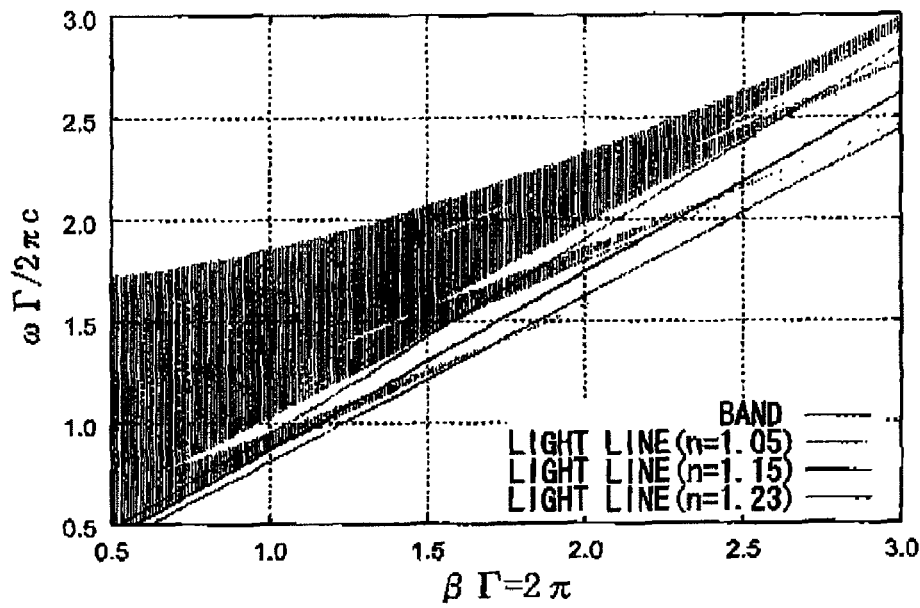
FIG. 8 is a graph illustrating the band structure of the extended triangular lattice shown FIG. 7.

The band structure of the extended triangular lattice shown FIG. 7 is illustrated in FIG. 8. In this case, the refractive index of quartz was n=1.45. In FIG. 7, black regions represent silica glass, and white regions represent holes. Further, band structure was calculated using a plane wave expansion method (See, S. G. Johnson and J. D. Joannopoulos, "Block-iterative frequency-domain methods for Maxwell's equations in planewave basis", Opt. Express, vol. 8, No. 3, pp. 173-190, 2001)

In FIG. 8, $\beta$ represents the wave number of propagation direction (direction perpendicular to the periodic structure), $\Gamma=2\Lambda$ represents the lattice constant of the extended triangular lattice, $\omega$ represents angular frequency, and c represents velocity of light. In addition, light line (n=1.05) represents dispersion curve when light is propagated through a conventional capillary core ($w_c/\Lambda=0.06$), and the region surrounded by band represents region where light is not propagated through the periodic structure in any direction, i.e., bandgap.

Figure 1:
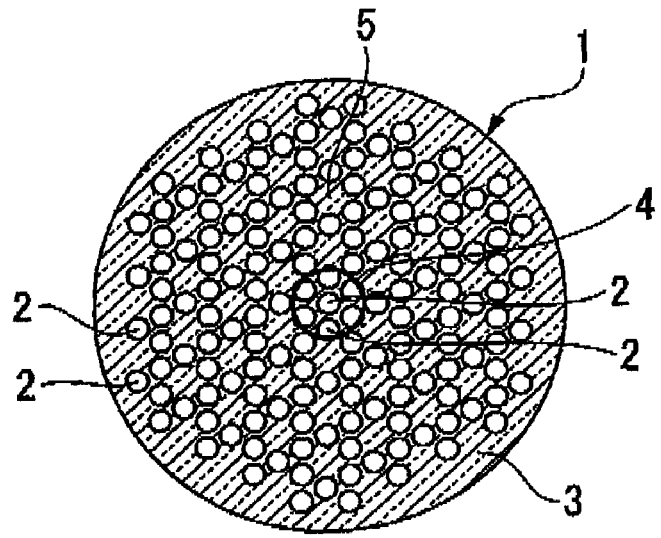
FIG. 1 is a cross-sectional view illustrating an example of a conventional, extended triangular lattice type PBGF.
Figure 2:
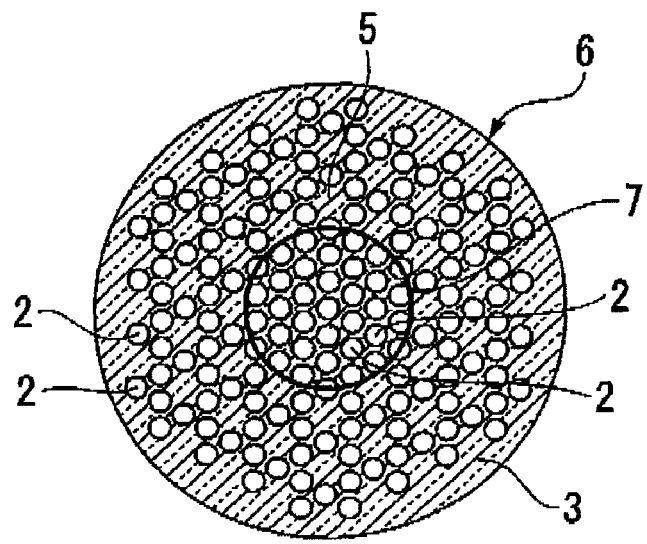
FIG. 2 is a cross-sectional view illustrating another example of a conventional, extended triangular lattice type PBGF.

In the case that the periodic structure of the extended triangular lattice is employed to the cladding of the PBGF, the conventional capillary core shown in FIGS. 1 and 2 is employed to the core, a region that light can be propagated through the core of the extended triangular lattice PBGF becomes a bandgap which is adjacent to light line n=1.05 and is present in the upper part of the light line. In this case, transmission bandwidth is the range that light line nearly traverses the bandgap.

If the thickness of the wall $w_c$ in the capillary core increases, the equivalent refractive index of the capillary core more and more increases, and thus light line increasingly slants downward. In the Figure, there are shown light line (n=1.15) when $w_c/\Lambda=0.18$ and light line (n=1.23) when $w_c/\Lambda=0.3$. As shown, the transmission bandwidth widen, since these light lines more extensively traverse the bandgap. Additionally, in this case, because transmission bandwidth is shifted to high frequency range (short wavelength side), in the desired transmission bandwidth, hole diameter can be lengthen. It facilities manufacture of the fiber. In this case, the equivalent refractive index of the capillary core was obtained using the approximation of the following equation (1):

$$n_{\it eff} = \frac{n_{air}S_{air} + n_{silica}S_{silica}}{S_{air} + S_{silica}}, \qquad (1)$$

where $n_{\it eff}$, $n_{air}$, $n_{silica}$, respectively represent the mean refractive index of the core, the refractive index of air, and refractive index of silica glass, $S_{air}$, $S_{silica}$, respectively represent the area within the core occupied by air, the area within the core occupied by silica glass.

Since the capillary core is the same as FIG. 6, each area is given by the following equation (2) and (3).

$$S_{air} = \frac{3}{4}(\Lambda - w_c)^2, \qquad (2)$$

$$S_{silica} = \frac{3}{4}[\Lambda^2 - (\Lambda - w_c)^2] \qquad (3)$$

In manufacture of the extended triangular lattice type PBGF of the invention, a plurality of capillaries made of silica glass and a plurality of rods made of silica glass are combined, preferably, are filled into silica glass tube and then heated and integrated to manufacture the base material of the fiber. Subsequently, thus obtained, the base material of the fiber is set in an optical fiber spinning apparatus and then drawn in a manner similar to that commonly employed in manufacturing the conventional optical fiber. In this way, the extended triangular lattice PBGF of the invention can be manufactured. In this case, it is preferred that a thick capillary is employed as the capillary of the core and a thin capillary is employed as the capillary of the cladding.

According to the invention, the extended triangular lattice type PBGF has a cladding in which the holes are arranged in an extended triangular lattice shape and a capillary core in which a plurality of holes are arranged in a triangular lattice shape. In particular, the extended triangular lattice type PBGF has the structure that the cross-sectional area of the respective holes in the capillary core is smaller than that of the respective holes in the cladding. Hence, it allows increasing the equivalent refractive index of the core, thus widening the operation region of the fiber. As a results, an improved PBGF having wider transmission bandwidth than that of the conventional PBGF can be obtained.

Example

Comparative Example 1

Figure 9:
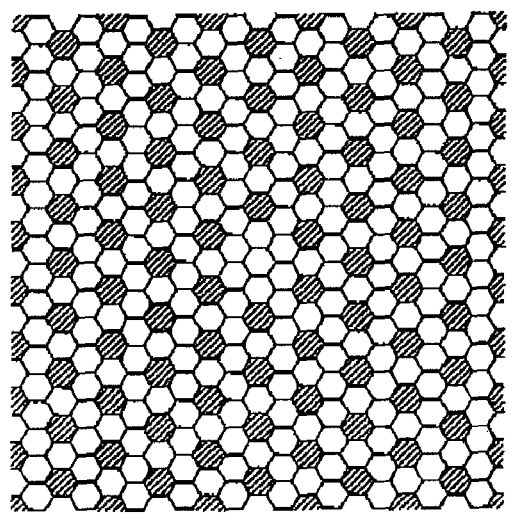
FIG. 9 is a cross-sectional view illustrating the main portion of the extended triangular lattice type PBGF manufactured in Comparative Example 1.
Figure 10:
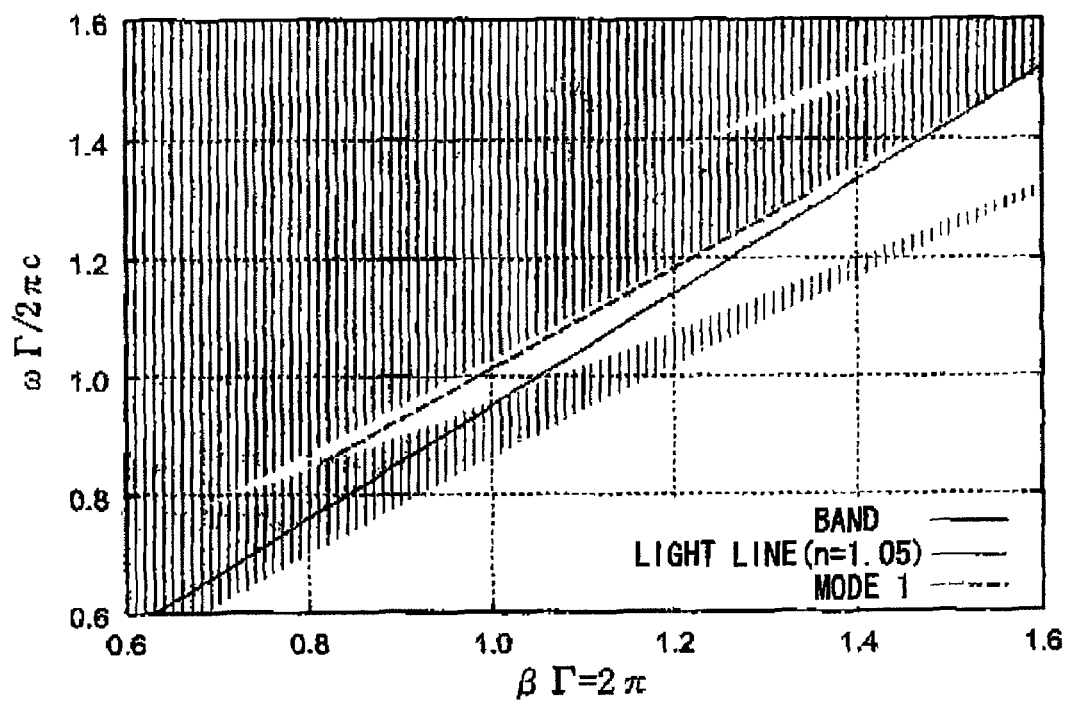
FIG. 10 is a graph illustrating dispersion within bandgap of the extended triangular lattice type PBGF manufactured in Comparative Example 1.

As shown FIG. 9, with respect to a fiber having conventional one layer capillary core having $w_r/\Lambda=1$, $w_b/\Lambda=0.06$ and $w_c/\Lambda=0.06$ (capillary core having seven holes in total, in which the one hole is arranged in the center, and the remaining six holes are arranged around the one hole), dispersion of propagation mode was calculated. FIG. 10 illustrates dispersion within bandgap. As shown, propagation mode is present in $\Gamma/\lambda=0.85$-1.32, where $\lambda$ represents wavelength.

Example 1

Figure 11:
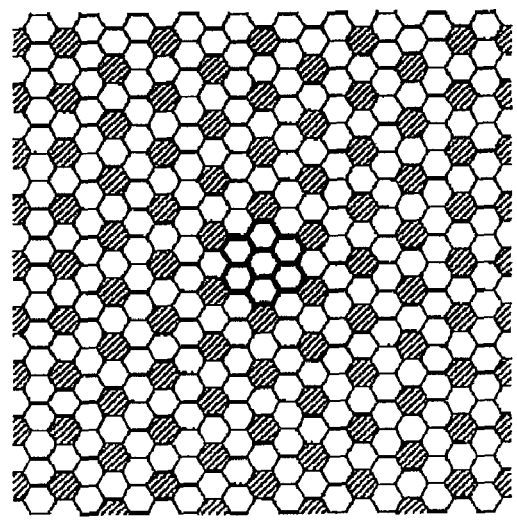
FIG. 11 is a cross-sectional view illustrating the main portion of the extended triangular lattice type PBGF manufactured in example 1.
Figure 12:
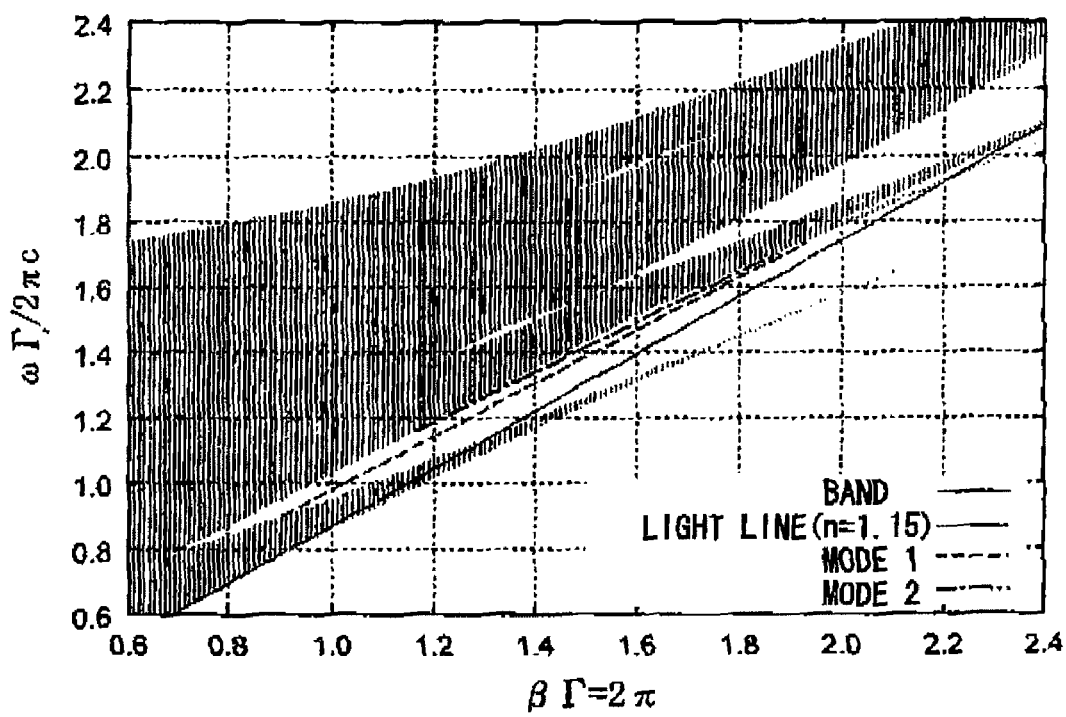
FIG. 12 is a graph illustrating dispersion within bandgap of the extended triangular lattice type PBGF manufactured in example 1.

A fiber having the thickness of $w_c/\Lambda=0.18$ was manufactured. As shown in FIG. 11, with respect to a fiber having one layer capillary core having $w_r/\Lambda=1$, $w_b/\Lambda=0.06$ and $w_c/\Lambda=0.18$ (capillary core having seven holes in total, in which the one hole is arranged in the center, and the remaining six holes are arranged around the one hole), dispersion of propagation mode was calculated. FIG. 12 illustrates dispersion within bandgap. As shown, propagation mode is present in $\Gamma/\lambda=0.92$-1.74, and bandwidth is extended up to 1.8 times the fiber of the Comparative Example 1. In this figure, "mode 2" is a higher mode.

Example 2

Figure 13:
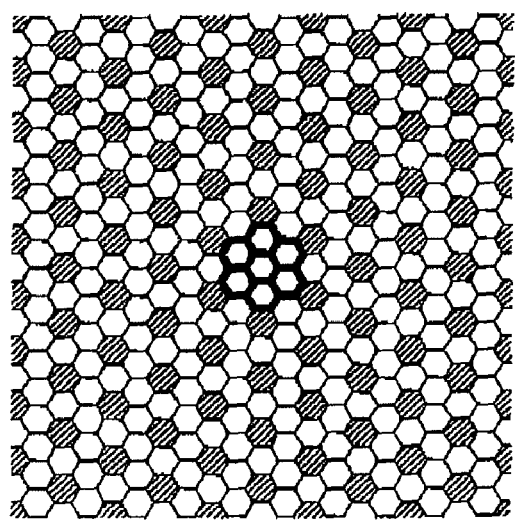
FIG. 13 is a cross-sectional view illustrating the main portion of the extended triangular lattice type PBGF manufactured in example 2.
Figure 14:
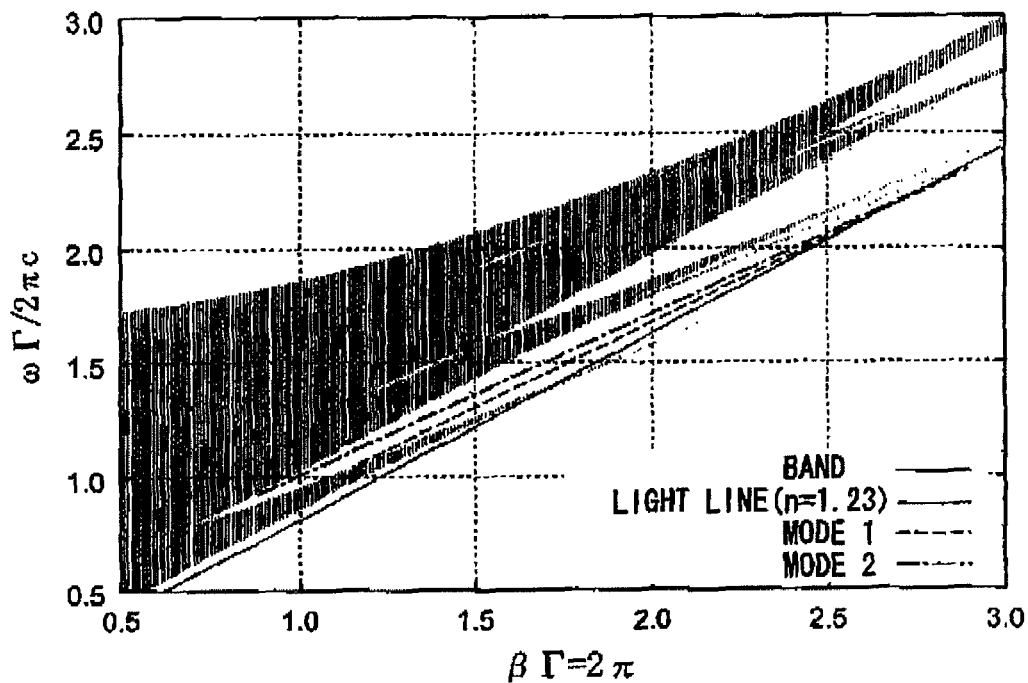
FIG. 14 is a graph illustrating dispersion within bandgap of the extended triangular lattice type PBGF manufactured in example 2.

As shown in FIG. 13, with respect to a fiber having one layer capillary core having $w_r/\Lambda=1$, $w_b/\Lambda=0.06$ and $w_c/\Lambda=0.3$ (capillary core having seven holes in total, in which the one hole is arranged in the center, and the remaining six holes are arranged around the one hole), dispersion of propagation mode was calculated. FIG. 14 illustrates dispersion within bandgap. As shown, propagation mode is present in $\Gamma/\lambda=0.92$-2.35, and bandwidth is extended up to 3 times the fiber of the Comparative Example 1. In this figure, "mode 2" is a higher mode.

Comparative Example 2

Figure 15:
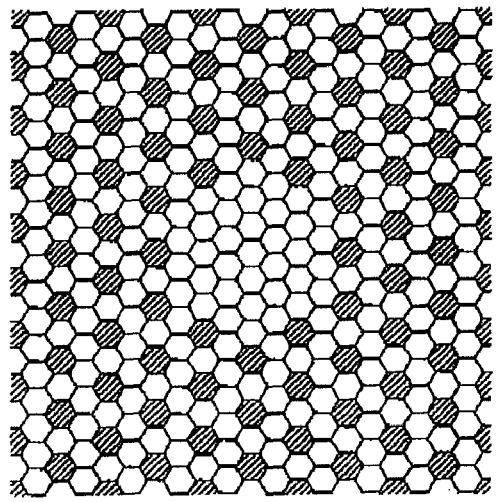
FIG. 15 is a cross-sectional view illustrating the main portion of the extended triangular lattice type PBGF manufactured in Comparative Example 2.
Figure 16:
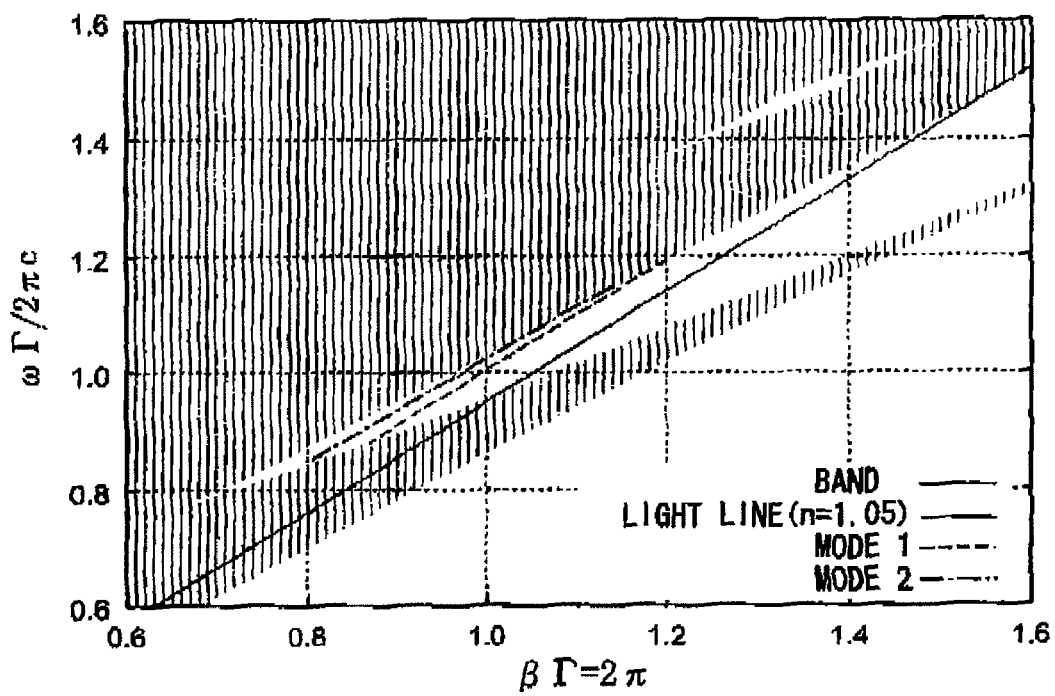
FIG. 16 is a graph illustrating dispersion within bandgap of the extended triangular lattice type PBGF manufactured in Comparative Example 2.

As shown in FIG. 15, with respect to a fiber having conventional three layers capillary core having $w_r/\Lambda=1$, $w_b/\Lambda=0.06$ and $w_c/\Lambda=0.06$ (capillary core having thirty seven holes in total, in which the one hole is arranged in the center of the core, six holes are arranged in the first layer surrounding the center of the core, twelve holes are arranged in the second layer surrounding the first layer and the remaining eighteen holes are arranged in the third layer surrounding the second layer), dispersion of propagation mode was calculated. FIG. 16 illustrates dispersion within bandgap. As shown, propagation mode is present in $\Gamma/\lambda=0.85$-1.18.

Example 3

Figure 17:
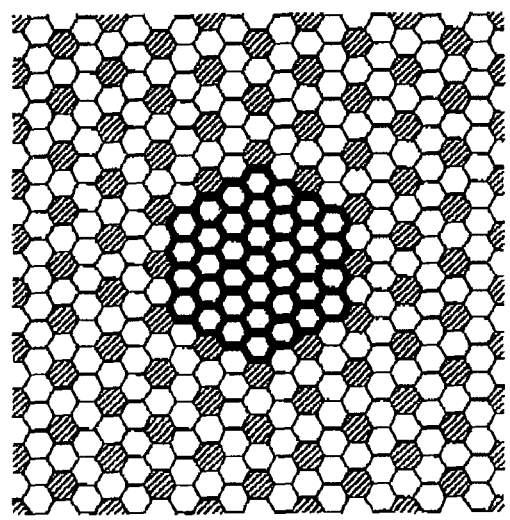
FIG. 17 is a cross-sectional view illustrating the main portion of the extended triangular lattice type PBGF manufactured in example 3.
Figure 18:
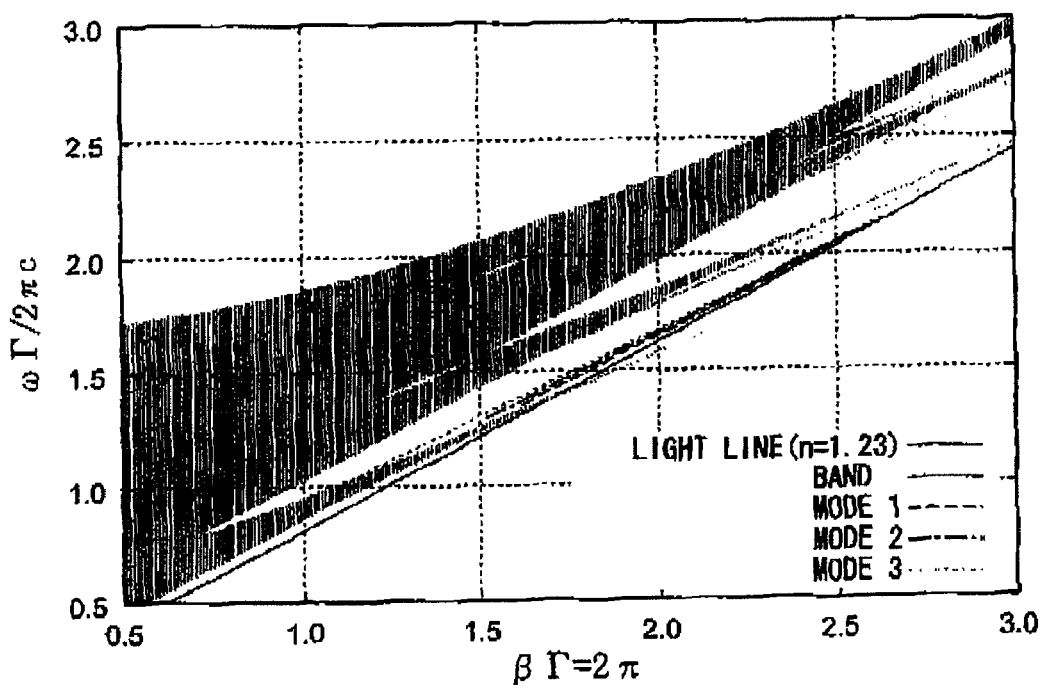
FIG. 18 is a graph illustrating dispersion within bandgap of the extended triangular lattice type PBGF manufactured in example 3.

A fiber having a higher $w_c$ with the thickness of $w_c/\Lambda=0.30$ was manufactured. As shown in FIG. 17, with respect to a fiber having three layers capillary core having $w_r/\Lambda=1$, $w_b/\Lambda=0.06$ and $w_c/\Lambda=0.18$ (capillary core having thirty seven holes in total, in which one hole is arranged in the center of the core, six holes are arranged in the first layer surrounding the center of the core, twelve holes are arranged in the second layer surrounding the first layer and the remaining eighteen holes are arranged in the third layer surrounding the second layer), dispersion of propagation mode was calculated. FIG. 18 illustrates dispersion within bandgap. As shown, propagation mode is present in $\Gamma/\lambda=1.02$-2.20, and bandwidth is extended up to 3.5 times the fiber of the Comparative Example 2. In this figure, "mode 2" and "mode 3" are higher modes.

Comparative Example 3

Figure 19:
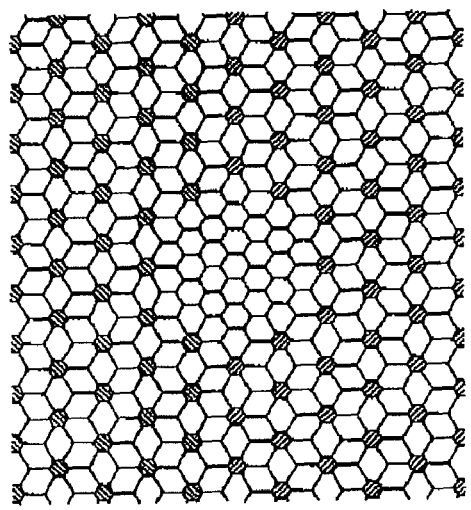
FIG. 19 is a cross-sectional view illustrating the main portion of the extended triangular lattice type PBGF manufactured in Comparative Example 3.
Figure 20:
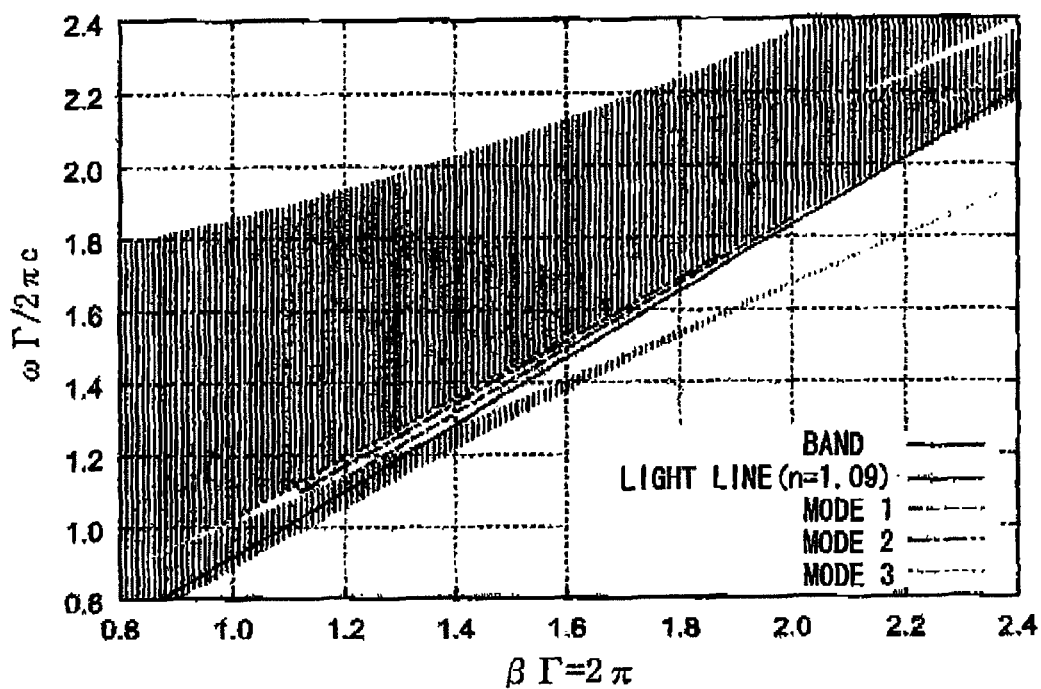
FIG. 20 is a graph illustrating dispersion within bandgap of the extended triangular lattice type PBGF manufactured in Comparative Example 3.

As shown in FIG. 19, with respect to a fiber having conventional three layers capillary core having $w_r/\Lambda=0.7$, $w_b/\Lambda=0.1$ and $w_c/\Lambda=0.1$ (capillary core having thirty seven holes in total, in which one hole is arranged in the center of the core, six holes are arranged in the first layer surrounding the center of the core, twelve holes are arranged in the second layer surrounding the first layer and the remaining eighteen holes are arranged in the third layer surrounding the second layer), dispersion of propagation mode was calculated. FIG.

20 illustrates dispersion within bandgap. As shown, propagation mode is present in $\Gamma/\lambda=1.0$-1.9.

Example 4

Figure 21:
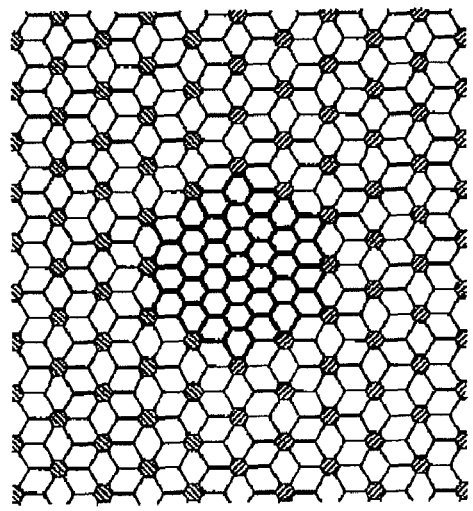
FIG. 21 is a cross-sectional view illustrating the main portion of the extended triangular lattice type PBGF manufactured in example 4.
Figure 22:
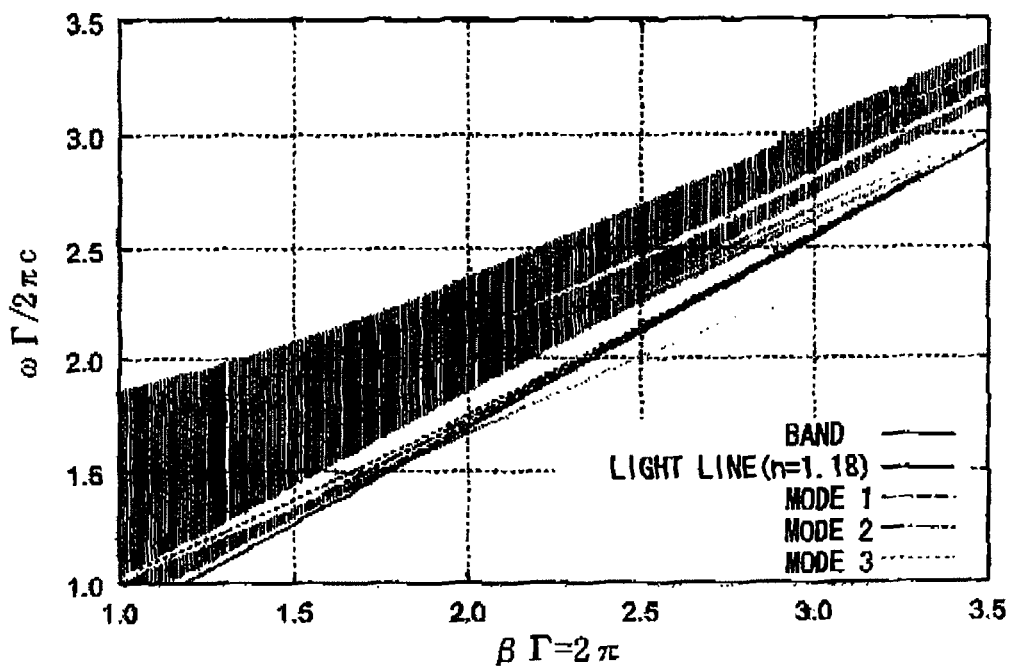
FIG. 22 is a graph illustrating dispersion within bandgap of the extended triangular lattice type PBGF manufactured in example 4.

A fiber having a higher $w_c$ with the thickness of $w_c/\Lambda=0.20$ was manufactured. As shown in FIG. 21, with respect to a fiber having three layers capillary core having $w_r/\Lambda=0.7$, $w_b/\Lambda=0.1$ and $w_c/\Lambda=0.2$ (capillary core having thirty seven holes in total, in which one hole is arranged in the center of the core, six holes are arranged in the first layer surrounding the center of the core, twelve holes are arranged in the second layer surrounding the first layer and the remaining eighteen holes are arranged in the third layer surrounding the second layer), dispersion of propagation mode was calculated. FIG. 22 illustrates dispersion within bandgap. As shown, propagation mode is present in $\Gamma/\lambda=1.02$-2.8, and bandwidth is extended up to 2 times the fiber of the Comparative Example 3. In this figure, "mode 2" and "mode 3" are higher modes.

Example 5

Figure 23:
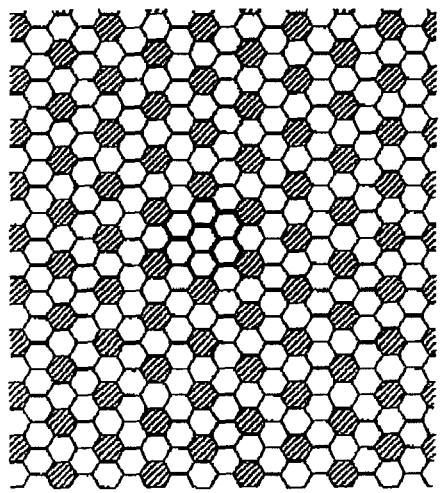
FIG. 23 is a cross-sectional view illustrating the main portion of the extended triangular lattice type PBGF manufactured in example 5.
Figure 24:
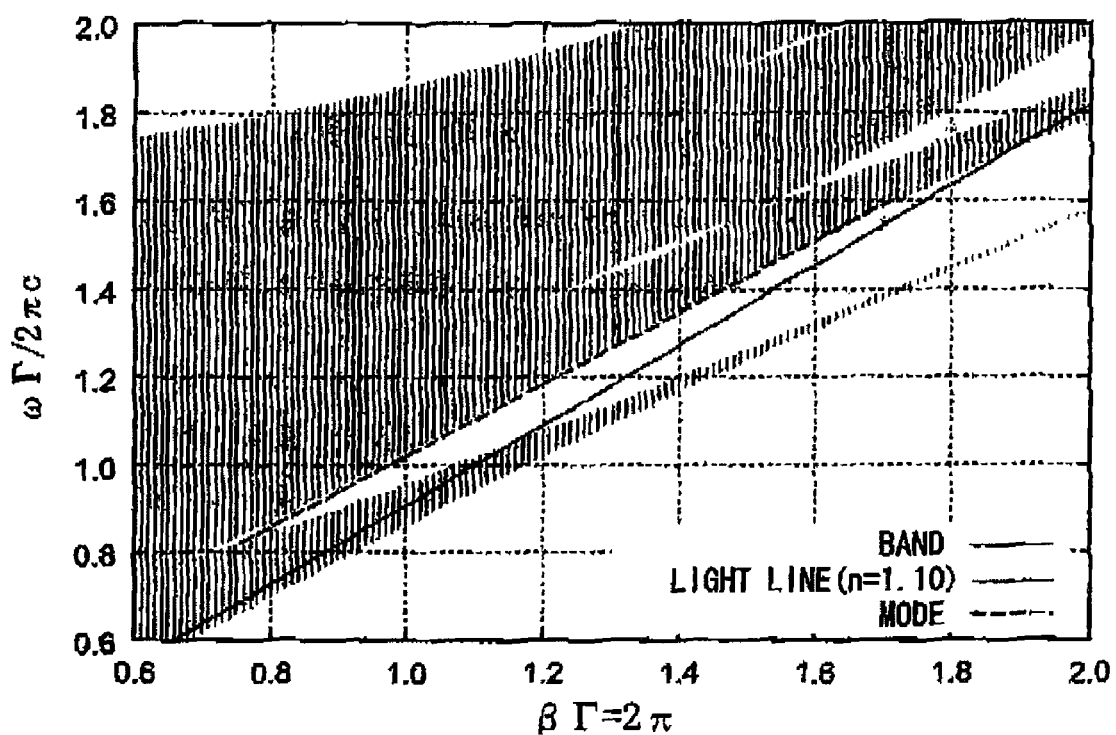
FIG. 24 is a graph illustrating dispersion within bandgap of the extended triangular lattice type PBGF manufactured in example 5.

A fiber which is similar to the Comparative Example 1, except that $w_c/\Lambda=0.12$ and operates in a single mode, was manufactured. As shown FIG. 23, with respect to a fiber having one layer capillary core having $w_r/\Lambda=1$, $w_b/\Lambda=0.06$ and $w_c/\Lambda=0.12$ (capillary core having seven holes in total, in which the one hole is arranged in the center and the remaining six holes are arranged around the one hole), dispersion of propagation mode was calculated. FIG. 24 illustrates dispersion within bandgap. As shown, propagation mode is present in $\Gamma/\lambda=0.83$-1.60, and operation bandwidth is extended up to 1.6 times the fiber of the Comparative Example 1.

While preferred exemplary embodiments of the invention have been described and illustrated above, it should be understood that these are examples of the invention and are not to be considered as limiting. Additions, omissions, substitutions, and other modifications can be made without departing from the spirit or scope of the exemplary embodiments of the invention as defined in the following claims.

What is claimed is:

1. An extended triangular lattice type photonic bandgap fiber, comprising:
    a cladding and,
    a capillary core,
    wherein the cladding comprises a plurality of holes disposed within a silica glass portion in a longitudinal direction of the fiber and arranged in an extended triangular lattice shape, wherein each of the plurality of holes has a hexagonal cross-section and a thickness of walls interposed between the plurality of holes is $w_b$;
    the capillary core comprises a plurality of holes arranged in a triangular lattice shape, wherein each of the plurality of holes has a hexagonal cross-section and a thickness of walls interposed between the plurality of holes is $w_c$;
    wherein the holes in the capillary core have a smaller cross sectional area than the holes in the cladding;
    wherein the holes in the cladding and in the core extend in the direction of propagation of light in the capillary core; and
    wherein $w_b < w_c$.

2. The extended triangular lattice type photonic bandgap fiber according to claim 1, wherein the plurality of holes of the capillary core comprise a one-hole layer at a center of the core and at least five layers of holes surrounding the one-hole layer.

3. The extended triangular lattice type photonic bandgap fiber according to claim 2, wherein the capillary core comprises a total of ninety one holes.

4. The extended triangular lattice type photonic bandgap fiber according to claim 2, wherein the capillary core comprises the one-hole layer at the center of the core and seven layers of holes surrounding the one-hole layer.

* * * * *